United States Patent [19]

Boncoeur et al.

[11] Patent Number: 4,614,637

[45] Date of Patent: Sep. 30, 1986

[54] PROCESS FOR THE PRODUCTION OF POROUS PRODUCTS MADE FROM BORON OR BORON COMPOUNDS

[75] Inventors: Marcel Boncoeur, Paris; Bernard Hansz, Vert le Petit; Thierry Lieven, Montrouge, all of France

[73] Assignee: Commissariat a l'Energie Atomique, Paris, France

[21] Appl. No.: 726,728

[22] Filed: Apr. 24, 1985

[30] Foreign Application Priority Data

Apr. 26, 1984 [FR] France ............................... 84 06578

[51] Int. Cl.$^4$ .................................................. B22F 3/10
[52] U.S. Cl. ................................................ 419/2; 419/12;
419/54; 419/57; 419/60; 423/289; 423/298; 156/DIG. 86; 501/96
[58] Field of Search .................. 419/2, 12, 54, 57, 60; 423/298, 289; 156/DIG. 86; 501/96

[56] References Cited

U.S. PATENT DOCUMENTS

| 2,073,826 | 3/1937 | Balke ........................................ 419/12 |
| 2,794,708 | 6/1957 | Haag ........................................ 23/209 |
| 2,974,040 | 3/1961 | Fisher et al. ............................. 419/12 |
| 4,011,051 | 3/1977 | Helton et al. ............................ 419/12 |

FOREIGN PATENT DOCUMENTS 1508451 11/1967 France .

Primary Examiner—Stephen J. Lechert, Jr.

[57] ABSTRACT

The invention relates to a process for the production of porous products of boron or boron compounds.

This process comprises the following stages:
(1) suspending the boron powder in a solution of an alkali metal salt, hydroxide and/or oxide,
(2) then separating the powder from the suspension liquid by settling,
(3) drying the thus separated powder to obtain an agglomerated powder, and
(4) subjecting the thus obtained agglomerated powder to at least two heat treatments performed at different temperatures, the final stage of the heat treatment being performed at a temperature of 1500° to 2200° C. and the first stage being performed at a temperature below that of the final stage.

The heat treatment can be performed in three stages, as shown in the attached graph.

8 Claims, 2 Drawing Figures

PROCESS FOR THE PRODUCTION OF POROUS PRODUCTS MADE FROM BORON OR BORON COMPOUNDS

BACKGROUND OF THE INVENTION

The present invention relates to a process for the production of porous products made from boron or boron compounds and particularly to high purity products enriched with boron 10.

For certain nuclear applications, it is advantageous to use boron 10-enriched compounds, particularly for bringing about the absorption of slow neutrons. However, the presently known methods for the production of boron 10, in most cases, lead to boron containing a certain number of impurities, including oxygen and carbon.

In the same way, the known boron production processes, such as the reduction of boron oxide $B_2O_3$ by magnesium or calcium lead to impure boron. Moreover, during storage in air, the boron reacts with oxygen to give boric anhydride or boric acid as a function of the ambient humidity, so that the boron is contaminated by oxygen. However, for the production of members based on boron or metallic borides by powder metallurgy, it is necessary to have very pure powders of boron or crystalline boride, which also have a given grain size distribution.

The present invention relates to a process for producing porous borons or boron compound products making it possible to obtain high purity, crystalline products, which can be transformed into powders having desired grain sizes for producing members by powder metallurgy.

SUMMARY OF THE INVENTION

The present invention therefore relates to a process for the production of porous boron products comprising successively the following stages:

(1) suspending the boron powder in a solution of an alkali metal salt, hydroxide and/or oxide, (2) then separating the powder from the suspension liquid by settling, (3) drying the thus separated powder to obtain an agglomerated powder, and (4) subjecting the thus obtained agglomerated powder to at least two heat treatments performed at different temperatures, the final stage of the heat treatment being performed at a temperature of 1500° to 2200° C. and the first stage being performed at a temperature below that of the final stage.

The above process makes advantageous use of the fact that by using as the starting product an aqueous solution of an alkali metal salt, hydroxide and/or oxide, containing in suspension the boron powder, a volatile flux (alkali metal oxide, hydroxide or salt) is introduced between the boron powder grains, which acids contact between the grains and the diffusion of impurities during subsequent heat treatments. Thus, good results can be obtained by heat treatment without it being necessary to perform a powder compression stage.

During the heat treatment, the boric acid present in the boron powder is firstly transformed into boric anhydride and then on the outer surface of the agglomerated powder is formed a boron carbide $B_4C$-rich film, which can then be easily detached to obtain a high purity, porous boron product. Due to its porous nature, the product can easily be transformed into a powder having an appropriate grain size for the production of boron members by powder metallurgy.

According to a variant of the invention, porous products of borides of a metal M or a metalloid, e.g. silicon boride $SiB_6$ are produced by using as the starting products boron and an oxide of the metal M or an oxide of the metalloid, e.g. $SiO_2$. In this case, the process successively comprises the following stages:

(1) suspending, accompanied by stirring, the boron powder and the powder of an oxide of metal M or an oxide of the metalloid in a solution of an alkali metal salt, oxide and/or hydroxide, (2) then separating the powder mixture from the suspension liquid by settling, (3) drying the thus separated powder mixture to obtain an agglomerated powder, and (4) subjecting the thus obtained agglomerated powder to a heat treatment comprising at least two stages performed at different temperatures, so as to purify the boron and transform the boride powder of metal M or the metalloid by reaction with the oxide of metal M or the oxide of the metalloid.

As hereinbefore, the presence of an alkali metal salt, oxide and/or hydroxide serving as the volatile flux, makes it possible to assist the diffusion of the boron and the impurities, as well as the reduction reaction of the oxide of metal M by the boron. In the same way, the presence of this flux makes it possible to increase contacts between the grains and makes it unnecessary to compress the powder before subjecting it to the heat treatment.

Generally, for the preparation of the suspension, use is made of an alkali metal hydroxide, such as NaOH, LiOH or KOH. It is also possible to use an alkali metal salt, such as borax $Na_2B_4O_7$ or sodium carbonate $Na_2CO_3$. Preference is given to the use of an aqueous soda solution.

For performing the process of the invention, the boron powder and optionally the oxide powder of the metal M is intimately mixed in the alkali metal salt, hydroxide and/or oxide solution. The solid material is then left to settle in a mould and the excess liquid is removed. After this operation, drying takes place to evaporate the residual liquid, e.g. by stoving at a temperature of approximately 100° C. Thus, an agglomerated powder, or a solid, porous cake is obtained, which can easily be removed from the mould.

The boron powder used for preparing the suspension generally has a grain size below 60 $\mu$m and preferably from 5 to 10 $\mu$m. The metallic oxide powder used for preparing the suspension generally has a grain size below 20 $\mu$m and preferably from 1 to 10 $\mu$m.

In order to prepare the suspension for producing porous metallic boron products, use is made of boron powder and metallic oxide quantities such that they correspond to a boron excess compared with the quantity required for obtaining the metallicboride. The solution quantity used for the preparation of the suspension generally represents 10 to 20% by weight of the suspension and the alkali metal oxide, hydroxide and/or salt concentration of the solution is generally 0.01 to 0.05%.

In the fourth stage of this process, the cake undergoes a heat treatment comprising at least two stages performed at different temperatures. In general, the heat treatment is performed under vacuum. However, in certain cases, it is preferable to perform the final stage or stages of this treatment under a neutral gas atmosphere, e.g. under argon, helium or nitrogen scavenging. The number, temperature and duration of the different stages of the heat treatment are chosen as a function of the nature of the product to be produced.

In all cases, the temperature and duration of the final stage of the heat treatment are regulated as a function of the size of the grains which it is wished to obtain. Thus, the size of the grains of the porous products increases with the duration of the heat treatment.

For the production of porous boron products, the heat treatment generally comprises three stages:

a first stage performed at a temperature of 150° to 225° C. for a time adequate for converting the boric acid into boric anhydride, a second stage performed at a temperature of 1500° to 1980° C. for a time adequate for stabilizing the pressure at a level below $10^2$ Pa, and a third stage performed at a temperature of 1980° to 2020° C. for a time between 60 and 30 h.

For the production of porous metallic boride products, there are generally at least three stages performed at different temperatures ranging between 800° and 2200° C., each of the stages being performed at a temperature higher than that of the preceding stage and each of the stages being performed under vacuum or a neutral gas, such as helium. In this case, the first stage or stages are preferably performed under a vacuum and the following stages under neutral gas, e.g. helium scavenging.

The process according to the invention is more particularly applicable to the production of products formed from rare earth borides, uranium borides, thorium borides, silicon borides, titanium borides and zirconium borides.

The process is particularly advantageous for the production of very boron-rich borides, such as borides of formula $B_xM$, in which M represents a metal and x is a number between 6 and 100. Thus, the presence of the volatile flux constituted by the alkali metal hydroxide, oxide or salt makes it possible to ensure a good diffusion of the boron between the metal oxide powder grains and to in this way obtain, during the heat treatment, a substantially complete reaction of the boron and the oxide.

DETAILED DESCRIPTION OF THE DRAWINGS AND PREFERRED EMBODIMENTS

Figure 1:
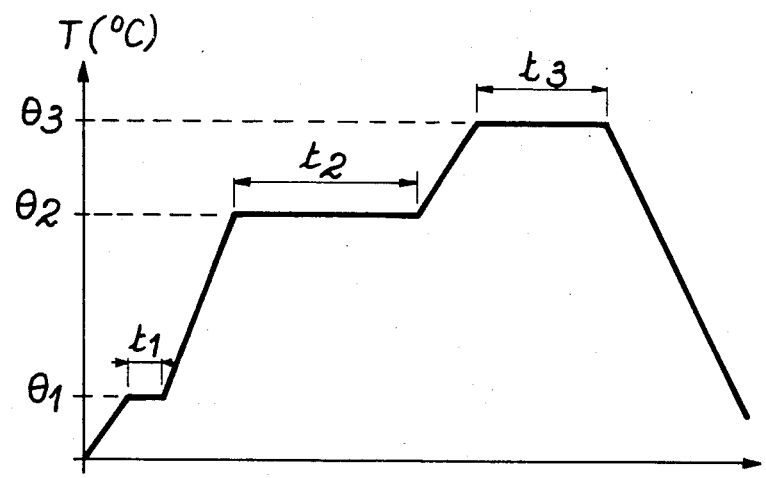
Figure 2:
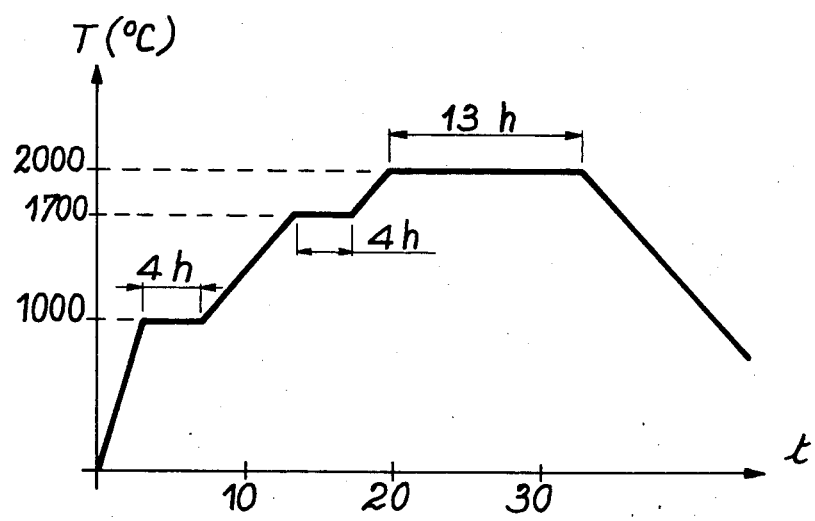

The invention is described in greater detail hereinafter relative to non-limitative exemplified embodiments with reference to the attached FIGS. 1 and 2, which are graphs showing the heat treatment cycles for the production of porous boron products (FIG. 1) and porous thorium boride products (FIG. 2).

EXAMPLE 1

Production of porous boron products.

The starting product is an amorphous boron powder and 15 kg thereof is suspended in an aqueous soda solution obtained by mixing 23.3 ml of soda with a density of 1.33 with two litres of soft water. The mixture is then stirred for 2 hours. The suspension is then introduced into a perforated mould and the powder is allowed to settle in the mould, whilst eliminating the excess liquid. The powder which has settled in the mould then undergoes a stoving reaction, in order to eliminate the residual liquid. Stoving is performed at a temperature of 100° C., under air, for 192 h and at the end of this operation an agglomerated powder cake is obtained. The cake is then cooled in the oven to a temperature enabling it to be handled. The mould is then removed from the oven and cooling is allowed to take place to ambient temperature. The cake is then removed from the mould and is placed in a graphite crucible on boron nitride blocks within a vacuum induction furnace for carrying out the heat treatment.

Initially, the furnace is raised to the temperature $\theta_1$ of 150° to 225° C. and it is maintained at this level for 1 hour, in order to convert the boric acid into boric anhydride. The temperature is then increased to $\theta_2$ of 1850° C. at a rate between 125° and 200° C./h. The temperature $\theta_2$ of 1850° C. is then maintained for a sufficient time to stabilize the pressure in the furnace at a level below $10^2$ Pa. At the end of this operation, the temperature is further raised to $\theta_3 = 1980°$ to 2020° C. in 4 h, this temperature being maintained for between 7 and 27 h, which is chosen as a function of the average final size of the particles which it is wished to obtain. The temperature is then reduced to ambient temperature at a rate between 100° and 200° C./h.

The different stages of this treatment are illustrated in the attached figure, which is a graph showing the evolution of the temperature (in °C.) as a function of the time (in hours) during the heat treatment cycle.

On leaving the furnace, the ingot has an easily detachable $B_4C$-rich outer skin and after eliminating said skin, it is possible to coarsely crush the ingot.

The thus crushed fragments are then subject to a grinding operation to obtain the desired grain size and this can be carried out in a vibrating grinder with a steel jar lined with steel balls having a filling coefficient of one third powder and one third balls by volume. Grinding can be carried out for 1 hour at a vibrating frequency of 25 Hz and an amplitude of 2 mm. In this way, a boron powder is obtained, which is classified into different grain size fractions by passing through vibrating screens. This is followed by the elimination of the iron particles from the grinding operation and which are present in each grain size fraction. This can be carried out with the aid of a magnetic device, which is appropriately positioned above a vibrating trough.

The same treatment is used for various boron powders having different C and oxygen contents, followed by the determination of the oxygen and carbon contents of the powders obtained at the end of the operation. The results are given in the following table 1, which also indicates the temperatures and durations of the second stage of the heat treatment. It is pointed out that in these examples, the first stage of the heat treatment is performed at $\theta_1$: 200° C. for 1 h and the third stage at a temperature $\theta_3$ between 1980° and 2000° C. for a time between 7 and 27 h.

It can be seen from this table that, as a result of the inventive process, it is possible to considerably reduce the oxygen content of the boron powder, whilst also reducing the carbon content.

The average size of the grains of the porous products obtained at the end of the third heat treatment stage is determined, when said stage is performed at different temperatures and for different periods of time. The results obtained are given in the following table 2. It can be seen that the product is formed from crystals having a sufficient size for a powder fitting operation to be possible.

EXAMPLE 2

Production of porous thorium boride products.

The starting product is a boron powder with a grain size below 50 μm and 11 kg of said powder and 3.9 kg of thorium oxide of grain size below 10 μm are suspended in an aqueous soda solution obtained by mixing 23.3 ml of soda with a density of 1.33 and 2 liters of soft water. The cake is produced in the same way as in example 1. The heat treatment is performed in three stages, as shown in the attached FIG. 2.

The temperature of the furnace is raised to $\theta_1 = 1000°$ C. over 3 hours and is maintained at this level for 4 hours. The temperature is then raised to $\theta_2 = 1700°$ C. over 6 hours, the stage lasting 4 hours. The temperature is then raised to 2000° C. in 2.5 hours and this temperature is maintained for 13 hours. Scavenging with a neutral gas, such as argon or helium takes place during all or part of the treatment stage at temperature $\theta_2$. The temperature is then lowered to ambient temperature at a rate of 1000° C./h. The ingot obtained is subjected to the grinding and selection treatment described in example 1.

The powder obtained in this way is a thorium boride. The impurity contents are typically oxygen content below 60 ppm and carbon content approximately 0.2%.

TABLE 1

| Initial oxygen content (%) | Initial carbon content (%) | Temperature $\theta_2$ (°C.) | Duration of stage at $\theta_2$/h | Final oxygen content (ppm) | Final carbon content (%) | Crystalline state |
|---|---|---|---|---|---|---|
| 3.2 | 1.2 | 1850 | 17 | 360 | 0.47 | crystallized |
| 3.2 | 1.2 | 1850 | 16 | 380 | 0.58 | crystallized |
| 5.7 | 1.91 | 1850 | 17 | 500 | 1.15 | crystallized |
| 13.1 | 1.51 | 1850 | 18 | 800 | 1.02 | crystallized |

TABLE 2

| $\theta_1$ (in °C.) | Duration of stage at $\theta_1$ (inh) | $\theta_2$ (in °C.) | duration of stage at $\theta_2$ (inh) | $\theta_3$ (in °C.) | Duration of stage at $\theta_3$ (inh) | Mean grain size (in μm) |
|---|---|---|---|---|---|---|
| 200 | 1 | 1850 | 17 | 1980 | 7 | 35 |
| 200 | 1 | 1850 | 17 | 1980 | 17 | 50 |
| 200 | 1 | 1850 | 17 | 2000 | 27 | 75 |

What is claimed is:

1. A process for the production of porous boron products comprising successively the following stages:
   (1) suspending the boron powder in a solution of an alkali metal salt, hydroxide and/or oxide,
   (2) then separating the powder from the suspension liquid by settling,
   (3) drying the thus separated powder to obtain an agglomerated powder, and
   (4) subjecting the thus obtained agglomerated powder to at least two heat treatments performed at different temperatures, the final stage of the heat treatment being performed at a temperature of 1500° to 2200° C. and the first stage being performed at a temperature below that of the final stage.

2. A process for the production of porous products of a boride of a metal M or a metalloid, wherein it successively comprises the following stages:
   (1) suspending, accompanied by stirring, the boron powder and the powder of an oxide of metal M or an oxide of the metalloid in a solution of an alkali metal salt, oxide and/or hydroxide,
   (2) then separating the powder mixture from the suspension liquid by settling,
   (3) drying the thus separated powder mixture to obtain an agglomerated powder, and
   (4) subjecting the thus obtained agglomerated powder to a heat treatment comprising at least two stages performed at different temperatures, so as to purify the boron and transform the boride powder of metal M or the metalloid by reaction with the oxide of metal M or the oxide of the metalloid.

3. A process according to either of the claims 1 or 2, wherein the alkali metal hydroxide is chosen from the group including NaOH, LiOH or KOH.

4. A process according to either of the claims 1 or 2, wherein the alkali metal salt is or $Na_2B_4O_7$ or $Na_2CO_3$.

5. A process according to either of the claims 1 or 2, wherein use is made of an aqueous soda solution for preparing the suspension.

6. A process according to claim 1, wherein the heat treatment comprises three stages:
   a first stage performed at a temperature of 150° to 225° C. for a time adequate for converting the boric acid into boric anhydride,
   a second stage performed at a temperature of 1500° to 1980° C. for a time adequate for stabilizing the pressure at a level below $10^2$ Pa, and
   a third stage performed at a temperature of 1980° to 2020° C. for a time between 60 and 30 h.

7. A process according to claim 2, wherein the heat treatment comprises at least three stages performed at temperatures of 800° to 2200° C., each of the stages being performed at a temperature higher than that of the preceding stage and each of the stages is performed under vacuum or under a neutral gas, such as helium.

8. A process according to claim 2, wherein the metal M is chosen from the group including rare earth, uranium, thorium, silicon, titanium and zirconium.

* * * * *